May 31, 1932. F. W. KENNEDY 1,860,860
PACKING DEVICE
Filed Aug. 8, 1930
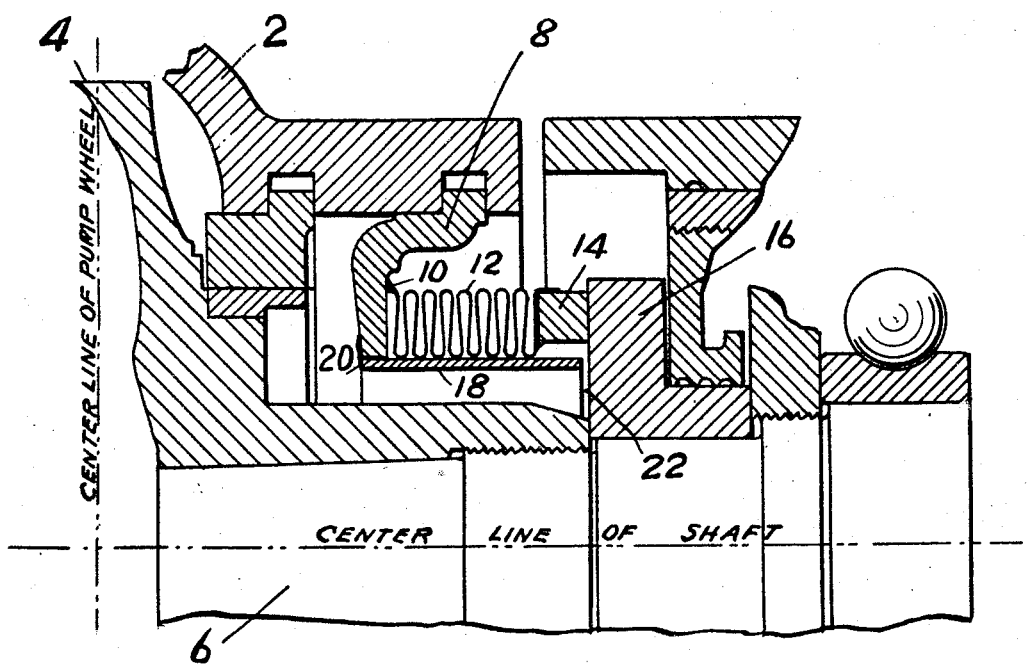
WITNESS:
INVENTOR
Frank W. Kennedy
BY
Busser & Harding
ATTORNEYS.

Patented May 31, 1932

1,860,860

UNITED STATES PATENT OFFICE

FRANK W. KENNEDY, OF TRENTON, NEW JERSEY, ASSIGNOR TO DE LAVAL STEAM TURBINE COMPANY, OF TRENTON, NEW JERSEY, A CORPORATION OF NEW JERSEY

PACKING DEVICE

Application filed August 8, 1930. Serial No. 473,802.

This invention relates to a packing box particularly adapted for the packing of a rotary pump shaft.

It has been customary to provide a packing for rotary pump shafts including a flexible bellows-like element consisting of a corrugated metal cylinder made either of sheet metal or, in large sizes, being turned out of a solid forging. Packings of this type generally work well but have two serious faults: first, any slight water hammer due to sudden closing of a valve or entrance of steam into the pump will cause the flexible element to buckle and fail; and, second, contact of the element with hot steam which under certain conditions enters the pump, affects its flexibility whereby its life is considerably shortened.

It is the object of the present invention to improve a packing device of this character so as to render it immune to the destructive conditions just mentioned.

In the accompanying drawing the figure is a fragmentary axial section through a packing box associated with a pump and embodying the invention.

The pump casing, indicated at 2 houses an impeller 4 carried by the shaft 6 having suitable bearings in the casing. A ring 8 carried by the casing has welded or otherwise secured thereto at 10 a flexible element 12 which may consist of a corrugated sheet metal cylinder or a forging turned to form corrugations to provide flexibility. Under some conditions this element may be of rubber or the like in which case it need not be corrugatd. To the outer end of element 12 is secured a carbon or other equivalent ring 14 bearing upon a steel collar 16 rotating with the shaft.

The packing arrangement so far described constitutes the common construction which, as noted above, is subject to failure under the action of water hammer or steam.

The improvement in this construction is effected by securing metallic or other rigid tube 18 concentrically with the shaft to the ring 8 at 20, this tube having a restricted clearance with the collar 16 as indicated at 22.

The tube 18 effectively prevents the detrimental action of the water hammer since the shock can only reach the flexible element through the tortuous path including the restricted opening and the energy thereof is accordingly practically dissipated before reaching the element. Likewise steam can reach the element only through the same long course and since water is ordinarily trapped therein overheating is prevented.

What I claim and desire to protect by Letters Patent is:

1. A packing device for a casing and a shaft passing into the casing including a flexible annular element supported by one and carrying means bearing on a surface carried by the other, and a rigid tube located between the flexible element and the shaft, and substantially cutting off free communication between the flexible element and the interior of the casing.

2. A packing device for a casing and a shaft passing into the casing including a flexible annular element supported by one and carrying means bearing on a surface carried by the other, and a rigid tube fixed relatively to the flexible element, located between the flexible element and the shaft, and substantially cutting off free communication between the flexible element and the interior of the casing.

3. A packing device for a casing and a shaft passing into the casing including a flexible annular element supported by the casing and carrying means bearing on a surface carried by the shaft, and a rigid tube supported by the casing between the flexible element and the shaft, and substantially cutting off free communication between the flexible element and the interior of the casing.

4. A packing device for a casing and a shaft passing into the casing including a flexible corrugated metallic element supported by the casing and carrying means bearing on a surface carried by the shaft, and a rigid tube supported by the casing between the flexible element and the shaft, and substantially cutting off free communication between the flexible element and the interior of the casing.

In testimony of which invention, I have hereunto set my hand at Trenton, N. J., on this 6th day of August, 1930.

FRANK W. KENNEDY.